United States Patent
Lafarge et al.

(12)

(10) Patent No.: US 10,851,222 B2
(45) Date of Patent: Dec. 1, 2020

(54) COMPOSITION BASED ON ALLYL MONOMERS AND PEROXIDE(S) FOR THE MANUFACTURE OF ORGANIC GLASSES

(71) Applicant: Arkema France, Colombes (FR)

(72) Inventors: Mélanie Lafarge, Suresnes (FR); Bruno Van Hemelryck, Chaponost (FR); Jean-Pierre Disson, Vernaison (FR)

(73) Assignee: ARKEMA FRANCE, Colombes (FR)

( * ) Notice: Subject to any disclaimer, the term of this patent is extended or adjusted under 35 U.S.C. 154(b) by 24 days.

(21) Appl. No.: 16/344,619

(22) PCT Filed: Oct. 26, 2017

(86) PCT No.: PCT/FR2017/052957
§ 371 (c)(1),
(2) Date: Apr. 24, 2019

(87) PCT Pub. No.: WO2018/078291
PCT Pub. Date: May 3, 2018

(65) Prior Publication Data
US 2020/0062924 A1    Feb. 27, 2020

(30) Foreign Application Priority Data

Oct. 26, 2016 (FR) .................... 16 60378

(51) Int. Cl.
| | | |
|---|---|---|
| *C08K 5/14* | (2006.01) | |
| *C08F 218/00* | (2006.01) | |
| *C08F 265/04* | (2006.01) | |
| *C08G 64/02* | (2006.01) | |
| *G02B 1/04* | (2006.01) | |

(52) U.S. Cl.
CPC .............. *C08K 5/14* (2013.01); *C08F 218/00* (2013.01); *C08F 265/04* (2013.01); *C08G 64/0291* (2013.01); *C08F 218/24* (2020.02); *G02B 1/041* (2013.01)

(58) Field of Classification Search
CPC ... C08L 31/00; C08G 64/0291; C08F 265/00; C08F 265/04; C08F 218/00; C08F 218/02; C08F 218/14; C08F 218/16; C08F 218/18; C08F 218/24; C08F 18/00; C08F 18/02; C08F 18/14; C08F 18/16; C08F 18/18; C08F 18/24; G02B 1/041; C08K 5/14
See application file for complete search history.

(56) References Cited

U.S. PATENT DOCUMENTS 4,607,087 A * 8/1986 Moriya .................. C08F 18/24
526/227

FOREIGN PATENT DOCUMENTS

| DE | 4012187 A1 | 10/1991 |
| EP | 0332386 A2 | 9/1989 |
| JP | H0873514 A | 3/1996 |

OTHER PUBLICATIONS

Database WPI, Week 199621, "Clarivate Analytics", Thomson Scientific, London, GB; AN 1996-205546, XP002771950, 2017, 3 pages.
ISA/EP; International Search Report and Written Opinion for International Application No. PCT/FR2017/052957 dated Jan. 23, 2018, 10 pages.

* cited by examiner

*Primary Examiner* — Christopher M Rodd
(74) *Attorney, Agent, or Firm* — NK Patent Law

(57) ABSTRACT

The present invention relates to the use of one or more specific organic peroxides for the polymerization of an allylic monomer and/or at least one allylic copolymer.
The invention also relates to a composition comprising at least one allylic monomer and/or at least one allylic copolymer and at least one specific organic peroxide.
The invention also relates to the use of the composition as defined above for the manufacture of an organic glass, preferably an ophthalmic lens, possibly optionally being tinted by means of pigments and/or organic dyes.

17 Claims, No Drawings

COMPOSITION BASED ON ALLYL MONOMERS AND PEROXIDE(S) FOR THE MANUFACTURE OF ORGANIC GLASSES

CROSS-REFERENCE TO RELATED APPLICATIONS

This application is a U.S. National Stage application of International Application No. PCT/FR2017/052957, filed on Oct. 26, 2017, which claims the benefit of French Patent Application No. 1660378, filed Oct. 26, 2016.

The present invention relates to the use of one or more specific organic peroxides for the polymerization of at least one allylic monomer and/or at least one allylic copolymer.

The invention also relates to a polymerizable composition comprising at least one allylic monomer and/or at least one allylic copolymer and at least one organic peroxide having the structure as defined below.

The invention also relates to the use of the composition as defined above for the manufacture of an organic glass, preferably an ophthalmic lens, possibly being tinted by means of pigments and/or organic dyes, that is to say by means of at least one colorant.

The present invention also relates to a process for preparing an organic glass from the polymerization of the composition as defined above, and also to the organic glass itself.

Organic glasses, such as instrument or optical detector windows or else ophthalmic lenses, may be prepared from the radical polymerization of one or more allylic monomers and/or allylic copolymers in the presence of one or more polymerization initiators, in particular organic peroxides.

By way of example, this polymerization may be carried out during a process involving a moulding step. In this case, the composition containing the mixture of allylic monomers and/or allylic copolymers in the presence of polymerization initiators may be poured into a mould, able to have a substantially concave or convex form, then polymerized and hardened during a more or less gradual temperature increase. Once the polymerization is finished, an organic glass is obtained which can then undergo different types of treatment depending on the desired applications. As a variant, the composition may just as well be poured between two moulds, so as to recover, after polymerization, the corresponding organic glass.

However, organic peroxides, regularly used as polymerization initiators, are species which are generally highly unstable when they are heated. Indeed, in the event of uncontrolled temperature increase, some organic peroxides may undergo autoaccelerated exothermic decomposition, and risk igniting and/or violently exploding. Such behaviour therefore proves difficult to reconcile especially with the rules in force in terms of transport and storage of dangerous materials in places intended for the production of organic glasses.

Thus, it proves particularly advantageous to formulate, in liquid form, the organic peroxides in solvents (also referred to as phlegmatizers), that is to say in the diluted state, in order to reduce the thermal instability thereof so as to be able subsequently to safely store and transport them.

To this end, organic peroxides belonging to the family of the dialkyl peroxydicarbonates may be dissolved in an allylic monomer such as diethylene glycol bis(allyl carbonate) (or ADC), sold for example under the name CR-39® by PPG or under the name RAV 7 by Acomon of the Mitsui group. In this case, the allylic monomer performs the role of a reactive phlegmatizer, which means that the function thereof is, on the one hand, to dissolve the organic peroxide and, on the other hand, to act in the radical polymerization of the allylic monomers and/or allylic copolymers, leading to the formation of the organic glasses.

In particular, the use of diisopropyl peroxydicarbonate (commonly referred to as IPP), dissolved in diethylene glycol bis(allyl carbonate) at an amount of 27% by weight relative to the total weight of the composition, during the radical polymerization of allylic monomer(s) and/or allylic copolymers makes it possible to give rise to organic glasses having good optical properties, especially in terms of transparency and weak coloration, and also to good mechanical properties. In other words, the organic glasses obtained with such an organic peroxide composition are transparent, colourless and have good mechanical properties in terms of wear. Such a composition based on organic peroxide is for example sold under the name Luperox® IPP27 by Arkema or under the trade name Perkadox® IPP-NS27 by Akzo.

However, the composition based on diisopropyl peroxydicarbonate still carries too great a risk of uncontrolled decomposition on storage and on transport in the case of an uncontrolled temperature increase.

Indeed, diisopropyl peroxydicarbonate is what is referred to as a cold peroxide, that is to say that it has, alone or in a mixture with other peroxides and/or phlegmatizers, whether reactive or unreactive, a maximum transport temperature, also referred to as control temperature, set at 20° C. in accordance with the UN recommendations on the transport of dangerous goods, 19th edition, 2015, in section 2.5.3.2.4 which relates to organic peroxides.

More generally, for the purposes of the present invention, cold peroxide is intended to mean any peroxide-based composition having a maximum transport temperature as defined above.

Thus, despite the dilution of the diisopropyl peroxydicarbonate in the allylic monomer, it proves necessary to constantly work at a temperature of less than or equal to 20° C. during the distribution of products such as Luperox® IPP27 or Perkadox® IPP-NS27, in order especially to minimize the risks of uncontrolled decomposition, which significantly complicates the conditions for transport and storage.

Moreover, it is necessary to control the temperature during the transport and storage of these products, so as to reduce the risks of the onset of polymerization of the allylic monomer, which has the function of phlegmatizing the organic peroxide.

Moreover, diisopropyl peroxydicarbonate has the drawback of being too reactive to be stored and transported at concentrations higher than 30% by weight in the allylic monomer.

In the prior art, it has already been envisaged to replace diisopropyl peroxydicarbonate as initiator in a radical polymerization based on allylic monomers for manufacturing organic glasses, with the aim of overcoming the drawbacks associated with the safety problems described above.

By way of examples, aromatic peroxides of diacyl or perester type have already been used.

Nonetheless, this type of organic peroxides, in particular benzoyl peroxide, induces significant yellowing of the organic glasses. In addition, the peresters also have the disadvantage of being poorly soluble in allylic monomers and induce, in the organic glasses, mechanical properties which are deemed to be too weak. This is especially the case for the peresters sold under the trade name Luperox® 575 (tert-amyl peroxy-2-ethylhexanoate), Luperox® 256 (2,5-dimethyl-2,5-di(2-ethylhexanoyl)peroxy)hexane).

Similarly, alkyl hydroxyperoxides, such as tert-butyl hydroperoxide, have also been envisaged.

However, such peroxides have the disadvantage of generating free radicals at temperatures which are too high, compared to those of the dialkyl peroxydicarbonates, to effectively carry out the radical polymerization of the allylic monomers. Indeed, the half life temperature (HLT) of the alkyl hydroxyperoxides, i.e. the temperature at which half the amount of peroxide is decomposed in a given time for a decomposition time of the same order of magnitude as the duration of polymerization for the allylic monomers, proves to be too high, by roughly several tens of degrees. In order to generate free radicals at much lower temperatures, systems for chemical activation, such as ferrous ions, have been added, but they have proved unsuitable due to the coloration induced in the polymer obtained, which has a negative impact on the optical quality of the organic glasses. Moreover, these activated hydroxyperoxide systems are difficult to dissolve in the allylic monomers.

Among the families of organic peroxides envisaged having a half life temperature of less than 130 degrees for a duration of 10 hours, cyclic perketals, such as those sold under the trade name Luperox® 331 or Trigonox® 22 (1,1-di(t-butylperoxy)cyclohexane) or else the trade name Luperox® 531 or Trigonox® 122 (1,1-di(t-amyl peroxy) cyclohexane), have been tested. Such organic peroxides have the advantage of being able to be stored and transported at ambient temperature and are not subject to a maximum transport temperature according to the UN recommendations for the transport of dangerous goods, as mentioned above.

However, the organic peroxides used in these commercial products are diluted in a solvent such as a hydrocarbon, a mineral oil or a phthalate, which has the consequence of degrading the optical and mechanical qualities of the organic glasses recovered after polymerization. Indeed, these products have the disadvantage of introducing, for safety reasons, a third non-polymerizable substance into the radical polymerization of the allylic monomers, thereby increasing the risks of heterogeneity in the finally obtained polymer.

As a variant, the use of other percarbonates such as those sold under the trade name Luperox® 221 or 225 (respectively, di-n-propyl percarbonate and di-sec-butyl percarbonate) has also been envisaged, as the latter lead to organic glasses having good optical or mechanical properties. However, these percarbonates again correspond to cold peroxides and pose the same safety problems in terms of transport and storage as the compositions based on diisopropyl peroxydicarbonate.

The outcome of this is that conventional peroxides frequently lead to organic glasses having poorer mechanical and optical properties than those of organic glasses obtained with cold peroxides.

Thus, one of the aims of the present invention is to overcome the abovementioned drawbacks, that is to say to substitute the organic peroxides commonly used during the radical polymerization of allylic monomers and/or allylic copolymers with other polymerization initiators which are able to be entirely safely stored and transported alone or in a mixture without degrading the optical and mechanical properties of the organic glasses obtained.

In other words, there is a real need to propose other polymerization initiators which are able to be stored and transported alone or in a mixture under temperature conditions strictly greater than 20° C., while still enabling the manufacture of organic glasses having good optical and mechanical properties, especially in terms of transparency, weak coloration and wear.

Therefore, a subject of the invention is especially the use of at least one peroxide of the following formula (I):

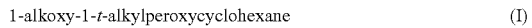

1-alkoxy-1-*t*-alkylperoxycyclohexane    (I)

in which formula (I) the alkoxy group comprises from 1 to 4 carbon atoms, the t-alkyl group comprises from 4 to 12 carbon atoms, and the cyclohexane ring is optionally substituted by 1 or 3 alkyl groups, each comprising from 1 to 3 carbon atoms;

for the polymerization of one or more allylic monomers and/or allylic copolymers.

The peroxides of formula (I) have the advantage of having, alone or in a mixture with other peroxides and/or phlegmatizers, whether reactive or unreactive, a maximum transport temperature, also referred to as control temperature, of strictly greater than 20° C. in accordance with the UN recommendations on the transport of dangerous goods, 19th edition, 2015, in section 2.5.3.2.4 which relates to organic peroxides.

Thus, the use of peroxides of formula (I), alone or in a mixture, makes it possible to improve safety conditions in terms of transport and storage compared to cold peroxides as defined above, especially with regard to organic peroxides belonging to the family of the dialkyl peroxydicarbonates, in particular diisopropyl peroxydicarbonate dissolved in diethylene glycol bis(allyl carbonate), and sold under the name Luperox® IPP27 or the name Perkadox® IPP-NS27.

In this way, the peroxides according to the invention are more readily handleable, in total safety, which makes it possible to significantly reduce costs linked to transport and storage.

The peroxides of formula (I) also have the advantage of being able to be used alone, that is to say in the undiluted state, which makes it possible, on the one hand, to dispense with the use of a non-polymerizable solvent, such as oils, imposed for safety reasons and liable to have a negative impact on the optical and mechanical qualities of the organic glasses obtained and, on the other hand, to dispense with the use of a polymerizable solvent, such as an allylic monomer, liable to increase the risks, on transport or on storage, of the onset of polymerization which is not temperature-regulated.

More generally, the peroxides of formula (I) make it possible to dispense with the provision of any type of storage intended for the polymerizable or non-polymerizable solvent at the sites for production of peroxide (or of any device intended for storing a solvent), which leads to a significant space gain and to the reduction of maintenance expenditure.

In other words, the peroxides according to the invention make it possible to overcome all sorts of problems associated with the use of polymerizable or non-polymerizable solvents.

More particularly, the peroxides according to the invention make it possible to dispense with the usual phlegmatizers for peroxides, such as hydrocarbons, such as isododecane, mineral oils, esters such as liquid phthalates, ethylbenzene or allylic monomers.

Thus, the peroxides of formula (I) may be stored in a wider variety of containers or devices than the conventional, thermally unstable peroxides which are liable to decompose during an uncontrolled temperature increase.

The peroxides according to the invention have a half life temperature at 10 hours (HLT 10 h) which is able to enable effective radical polymerization of the allylic monomers and/or allylic copolymers.

The peroxides according to the invention preferably have a half life temperature at 1 hour (HLT 1 h) which is close to the polymerization temperature.

The polymerization temperature of the composition according to the invention is 20° C. more or less than the half life temperature at 1 hour of the peroxide used, preferably 10° C. more or less than the half life temperature at 1 hour of the peroxide used.

In the case of a mixture of peroxides, the polymerization temperature is 20° C. more or less than the half life temperature at 1 hour of the peroxide having the highest HLT, preferably 10° C. more or less than the half life temperature at 1 hour of the peroxide having the highest HLT.

"Polymerization temperature" is intended to mean the maximum temperature reached during the thermal crosslinking cycle.

Thus, the peroxides envisaged may initiate the polymerization of the allylic monomers and/or the allylic copolymers without necessarily needing to rely on systems intended to activate them chemically, such as ferrous ions, which avoids the risks of coloration of the organic glasses.

Moreover, the organic glasses obtained, following polymerization of one or more allylic monomers and/or allylic copolymers in the presence of one or more peroxides of formula (I), have good optical and mechanical properties.

In particular, the organic glasses obtained are transparent, weakly coloured or even colourless, and resistant to wear.

Thus, the peroxide(s) of formula (I), used during the polymerization of one or more allylic monomers and/or allylic copolymers, make it possible to manufacture organic glasses.

Another subject of the invention is a composition comprising at least one peroxide of formula (I) as described above, and at least one allylic monomer and/or at least one allylic copolymer.

The composition according to the invention makes it possible to give rise, after polymerization, to organic glasses having good optical and mechanical properties.

The composition according to the invention is therefore polymerizable or able to polymerize.

Another subject of the present invention relates to an organic glass obtained by polymerization of the composition as defined above.

Similarly, the invention relates to a process for preparing an organic glass comprising at least one step of polymerization of a composition as defined above in a device comprising a mould.

Other characteristics and advantages of the invention will emerge even more clearly on reading the following description and examples.

In the following text, and unless indicated otherwise, the limits of a range of values are included, in this document.

The expression "at least one" is equivalent to the expression "one or more".

Use

As indicated above, the invention relates to the use of one or more peroxides of formula (I) as polymerization initiator for one or more allylic monomers and/or one or more allylic copolymers.

Thus, the invention relates especially to the use of one or more peroxides of formula (I) for the radical polymerization of one or more allylic monomers and/or one or more allylic copolymers.

In other words, the peroxide(s) of formula (I) is/are used especially as radical polymerization initiator.

The peroxide(s) of formula (I) may be used alone or in a mixture, especially with other polymerization initiators during the polymerization of one or more allylic monomers and/or one or more allylic copolymers.

The peroxide(s) of formula (I) are preferably used alone.

Alternatively, the peroxide(s) of formula (I) may be used in a mixture with one or more peroxides of formula (III):

bis-*t*-alkylperoxycyclohexane    (III)

in which formula (III) each t-alkyl group comprises from 4 to 12 carbon atoms, and the cyclohexane ring is optionally substituted by 1 or 3 alkyl groups, each comprising from 1 to 3 carbon atoms.

The compound of formula (III) is preferably selected from the group consisting of 1,1-di(tert-butylperoxy)-3,3,5-trimethylcyclohexane, 1,1-di(tert-amyl peroxy)cyclohexane, 1,1-di(t-butylperoxy)cyclohexane and mixtures thereof.

A particularly preferred mixture comprises 1-methoxy-1-tert-amylperoxycyclohexane as compound of formula (I) and at least one compound of formula (III), preferably selected from the group consisting of 1,1-di(tert-butylperoxy)-3,3,5-trimethylcyclohexane, 1,1-di(tert-amyl peroxy)cyclohexane, 1,1-di(t-butylperoxy)cyclohexane and mixtures thereof.

Preferably, when the peroxide(s) of formula (I) are used in a mixture with one or more other polymerization initiators, preferably with one or more peroxides of formula (III), the ratio between the compound(s) of formula (I) and the other polymerization initiator(s), preferably one or more peroxides of formula (III), is between 99:1 and 30:70, preferably between 50:50 and 99:1, even more preferentially between 60:40 and 80:20.

Peroxide of Formula (I)

The peroxide(s) according to the invention have a structure of formula (I):

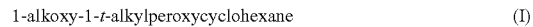

1-alkoxy-1-*t*-alkylperoxycyclohexane    (I)

in which formula (I) the alkoxy group comprises from 1 to 4 carbon atoms, the t-alkyl group comprises from 4 to 12 carbon atoms, and the cyclohexane ring is optionally substituted by 1 or 3 alkyl groups, each comprising from 1 to 3 carbon atoms.

Preferably, in formula (I), the alkoxy group corresponds to a methoxy or ethoxy group, preferentially to a methoxy group.

Preferably, in formula (I), the t-alkyl group comprises from 4 to 8 carbon atoms, preferentially four or five carbon atoms, more preferentially five carbon atoms.

According to one embodiment, the cyclohexane ring is substituted by 1 or 3 alkyl groups, each comprising from 1 to 3 carbon atoms, preferentially is substituted by three alkyl groups each having a carbon atom.

Preferably, the peroxide(s) of formula (I) is/are chosen from 1-methoxy-1-tert-amylperoxycyclohexane (TAPMC), 1-methoxy-1-t-butylperoxycyclohexane (TBPMC), 1-methoxy-1-t-amylperoxy-3,3,5-trimethylcyclohexane, 1-methoxy-1-t-butylperoxy-3,3,5-trimethylcyclohexane, 1-ethoxy-1-t-amylperoxycyclohexane (TAPEC), 1-ethoxy-1-t-butylperoxycyclohexane (TBPEC), 1-ethoxy-1-t-amylperoxy-3,3,5-trimethylcyclohexane and/or 1-ethoxy-1-t-butylperoxy-3,3,5-trimethylcyclohexane.

More preferentially, the peroxide of formula (I) is 1-methoxy-1-tert-amylperoxycyclohexane (TAPMC) as sold under the trade name Luperox®V10 by Arkema.

Advantageously, the peroxide(s) of formula (I) has/have a half life temperature at 10 hours, denoted HLT 10 h, of greater than or equal to 60° C. and less than or equal to 130° C.

Mixtures

The peroxide(s) of formula (I) may be used in a mixture, especially with other polymerization initiators.

Preferably, the peroxide(s) of formula (I) may be used in a mixture with one or more peroxides of formula (III):

bis-*t*-alkylperoxycyclohexane    (III)

in which formula (III) each t-alkyl group comprises from 4 to 12 carbon atoms, and the cyclohexane ring is optionally substituted by 1 or 3 alkyl groups, each comprising from 1 to 3 carbon atoms.

The compound of formula (III) is preferably selected from the group consisting of 1,1-di(tert-butylperoxy)-3,3,5-trimethylcyclohexane, 1,1-di(tert-amyl peroxy)cyclohexane, 1,1-di(t-butylperoxy)cyclohexane and mixtures thereof.

A particularly preferred mixture comprises 1-methoxy-1-tert-amylperoxycyclohexane as compound of formula (I) and at least one compound of formula (III), preferably selected from the group consisting of 1,1-di(tert-butylperoxy)-3,3,5-trimethylcyclohexane, 1,1-di(tert-amyl peroxy) cyclohexane, 1,1-di(t-butylperoxy)cyclohexane and mixtures thereof.

Preferably, when the peroxide(s) of formula (I) are used in a mixture with one or more other polymerization initiators, preferably with one or more peroxides of formula (III), the ratio between the compound(s) of formula (I) and the other polymerization initiator(s), preferably one or more peroxides of formula (III), is between 99:1 and 30:70, preferably between 50:50 and 99:1, even more preferentially between 60:40 and 80:20.

Allylic Monomer(s) and/or Allylic Copolymer(s)

The allylic monomer(s) may be chosen from bis(allyl carbonate) monomers.

Advantageously, the allylic monomer(s) is/are chosen from diol bis(allyl carbonate) monomers of the following formula (II):

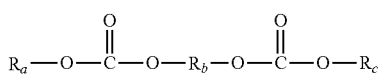

in which formula (II):

$R_a$ and $R_c$, which are identical or different, represent an allyl group of the following formula:

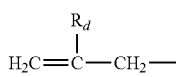

in which formula $R_d$ is chosen from:
a hydrogen atom,
a halogen atom, preferably a fluorine or chlorine atom,
a linear or branched $C_1$-$C_4$ alkyl group,
$R_b$ is chosen from alkylene groups, alkylene ether groups, aromatic alkylene ether groups, alkylene polyether groups, alkylene carbonate groups and mixtures thereof.

Preferably, in formula (II), $R_a$ and $R_c$ are identical.

Preferentially, $R_a$ and $R_c$ are identical and represent an allyl group in which $R_d$ represents a hydrogen atom, a chlorine atom, a bromine atom, a methyl group or an ethyl group.

More preferentially still, $R_a$ and $R_c$ are identical and represent an allyl group in which $R_d$ represents a hydrogen atom.

Preferably, $R_b$ represents an alkylene group, an alkylene ether group or an aromatic alkylene ether group.

More preferentially, $R_b$ represents an alkylene group or an alkylene ether group.

Even more preferentially, $R_b$ represents an alkylene ether group, especially the group with the following formula:

—$CH_2CH_2$—O—$CH_2$—$CH_2$—

In the formula (II), $R_b$ is preferably aliphatic, that is to say that it does not represent an aromatic alkylene ether group. In other words, the allylic monomer(s) is/are preferentially chosen from aliphatic diol bis(allyl carbonate) monomers of formula (II).

The allylic monomer(s) is/are preferably chosen from ethylene glycol bis(allyl carbonate), diethylene glycol bis (2-methyl carbonate), diethylene glycol bis(allyl carbonate) or ADC, ethylene glycol bis(2-chloro allyl carbonate), triethylene glycol bis(allyl carbonate), 1,3-propanediol bis (allyl carbonate), propylene glycol bis(2-ethyl allyl carbonate), 1,3-butenediol bis(allyl carbonate), 1,4-butenediol bis (2-bromo allyl carbonate), dipropylene glycol bis(allyl carbonate), trimethylene glycol bis(2-ethyl allyl carbonate), pentamethylene glycol bis(allyl carbonate), isopropylene bis phenol-A bis(allyl carbonate) and mixtures thereof.

Preferably, the allylic monomer is diethylene glycol bis (allyl carbonate), also referred to as ADC, such as that sold under the trade name CR-39 by PPG or RAV 7 by Acomon, of the Mitsui group.

Other allylic monomers may be used alone or in combination with the diol bis(allyl carbonate) monomers mentioned above, such as, for example, bis(allyl carbonate) monomers not comprising diol in their structure.

The allylic copolymer(s) may be obtained from the polymerization of the diol bis(allyl carbonate) monomers mentioned above.

The allylic copolymer(s) is/are preferably chosen from polyol poly(allyl carbonates).

The poly(allyl carbonates) is/are obtained from the polymerization of a polyol and a bis(allyl carbonate) monomer.

Among the polyols involved in the preparation of the polyol poly(allyl carbonates), mention may especially be made of polyols chosen from 1,6-hexanediol, 1,4-dimethanol cyclohexane, polylactone diols, polyethoxylated glyceryl diols, alpha, alpha-xylenediol, 1,4-bis(hydroxyethyl) toluene, 2,2-(bis(4-hydroxyethyl)phenyl)propane, pentaerythritol, trimethylol propane, dipentaerythritol, ditrimethylol propane, tris(hydroxyethyl)isocyanurate.

The allylic copolymer(s) chosen from polyol poly(allyl carbonates) may be used in combination with the above-mentioned allylic monomers, especially the diol bis(allyl carbonate) monomers of formula (II).

The allylic copolymer(s) may also be obtained from the polymerization of a bis(allyl)carbonate monomer and a polyether diol.

The polyether diol is preferably chosen from homopolymers, copolymers or block polymers of polyether diols, such as those described in patent application U.S. Pat. No. 6,506,864.

Preferably, the invention relates to the use of at least one peroxide of formula (I) for the radical polymerization of one or more allylic monomers, preferably those chosen from diol bis(allyl carbonate) monomers of formula (II).

More preferentially, the invention relates to the use of 1-methoxy-1-tert-amylperoxycyclohexane (TAPMC) for the radical polymerization of diethylene glycol bis(allyl carbonate)(ADC).

Composition

As indicated above, the composition according to the invention comprises at least one allylic monomer and/or at least one allylic copolymer and at least one polymerization initiator chosen from the peroxides of formula (I) as described above.

Preferably, the composition comprises at least one allylic monomer.

Preferably, the composition comprises at least one allylic monomer chosen from bis(allyl carbonate) monomers.

Preferably, the composition comprises at least one allylic monomer chosen from diol bis(allyl carbonate) monomers of formula (II), as described above, especially aliphatic diol bis(allyl carbonate) monomers of formula (II).

According to one embodiment, the composition comprises at least one peroxide of formula (I), in which the alkoxy group corresponds to a methoxy or ethoxy group, and at least one allylic monomer chosen from diol bis(allyl carbonate) monomers of formula (II), in which $R_a$ and $R_c$ are identical and represent an allyl group in which $R_d$ represents a hydrogen atom, and $R_b$ represents an alkylene group or an alkylene ether group.

Preferably, the composition comprises 1-methoxy-1-tert-amylperoxycyclohexane and at least one allylic monomer chosen from diol bis(allyl carbonate) monomers of formula (II) as described above.

More preferentially, the composition comprises diethylene glycol bis(allyl carbonate) and 1-methoxy-1-tert-amylperoxycyclohexane.

The peroxide(s) may be present in the composition according to the invention at an amount ranging from 0.01 to 10%, preferably ranging from 0.01 to 5% by weight relative to the total weight of the allylic monomer(s) and/or the allylic copolymers present in the composition.

Preferably, the peroxide(s) may be present in the composition according to the invention at an amount ranging from 0.01 to 10%, preferably ranging from 0.01 to 5% by weight relative to the total weight of the allylic monomer(s) present in the composition.

The composition according to the invention may also comprise at least one polymerization initiator other than the organic peroxides of formula (I).

In this case, the polymerization initiator may be an additional organic peroxide other than the organic peroxides of formula (I), or a non-peroxide compound.

In particular, the composition according to the invention may also comprise at least one additional organic peroxide other than the organic peroxides of formula (I).

Preferably, the additional organic peroxide(s) is/are chosen from the peroxides of formula (III):

bis-*t*-alkylperoxycyclohexane                                (III)

in which formula (III) each t-alkyl group comprises from 4 to 12 carbon atoms, and the cyclohexane ring is optionally substituted by 1 or 3 alkyl groups, each comprising from 1 to 3 carbon atoms.

The compound of formula (III) is preferably selected from the group consisting of 1,1-di(tert-butylperoxy)-3,3,5-trimethylcyclohexane, 1,1-di(tert-amyl peroxy)cyclohexane, 1,1-di(t-butylperoxy)cyclohexane and mixtures thereof.

A particularly preferred mixture comprises 1-methoxy-1-tert-amylperoxycyclohexane as compound of formula (I) and at least one compound of formula (III), preferably selected from the group consisting of 1,1-di(tert-butylperoxy)-3,3,5-trimethylcyclohexane, 1,1-di(tert-amylperoxy)cyclohexane, 1,1-di(t-butylperoxy)cyclohexane and mixtures thereof.

Preferably, when the peroxide(s) of formula (I) are used in a mixture with at least one additional peroxide other than the peroxides of formula (I), preferably chosen from the peroxides of formula (III), the ratio between the peroxide(s) of formula (I) and the at least one additional peroxide other than the peroxides of formula (I), preferably chosen from the peroxides of formula (III), is between 99:1 and 30:70, preferably between 50:50 and 99:1, even more preferentially between 60:40 and 80:20.

The composition according to the invention may also comprise one or more photoinitiators such as those chosen from acetophenone and benzophenone derivatives.

The composition according to the invention may also comprise one or more additional monomers other than the allylic monomers.

The additional monomer(s) is/are chosen from acrylic monomers or methacrylic monomers, such as those chosen from methyl acrylate, methyl methacrylate, phenyl methacrylate, vinyl acetate, isoallyl isophthalate, diallyl terephthalate and diallyl adipate.

The composition according to the invention may also comprise at least one pigment and/or at least one organic dye, that is to say at least one colorant.

In this case, the composition may also comprise at least one dispersant, which has the role of dispersing the pigment(s) within said composition.

According to a preferred embodiment, the composition comprises diethylene glycol bis(allyl carbonate) and 1-methoxy-1-tert-amylperoxycyclohexane and at least one pigment and/or an organic dye and optionally at least one dispersant.

The colorant is preferably a pigment.

The pigment which may be present in the composition may be organic or inorganic.

Among the inorganic pigments, mention may especially be made of mineral pigments which may optionally be surface-treated.

The mineral pigment(s) are preferably chosen from titanium oxides, especially titanium dioxide, iron oxides, such as red iron oxide and yellow iron oxide, and zirconium oxides.

The organic pigments may be chosen from phthalocyanine blue, phthalocyanine green, chromophtal violet and oxidized chromophtal green.

Among the pigments, mention may especially be made of phthalocyanine pigments, in particular copper phthalocyanine pigments, especially the blue copper phthalocyanine pigment, and iron oxides.

According to one embodiment, the pigments are inorganic.

Advantageously, the pigments are organic.

The composition according to the invention is especially liquid at ambient temperature, that is to say liquid at a temperature of between 10° C. and 30° C., more preferentially still between 15° C. and 25° C.

The composition according to the invention as defined above is a polymerizable composition, that is to say that it is able to polymerize under the action of heat, in particular at least at a temperature ranging from 40 to 140° C.

The invention also relates to the use of the polymerizable composition as defined above for the manufacture of an organic glass, preferably an ophthalmic lens, possibly optionally being tinted by means of pigments and/or organic dyes.

Preferably, the composition according to the invention may comprise a mould-release agent, such as Zelec® UN.

Organic Glass

The polymerizable composition according to the invention leads, after polymerization, to an organic glass.

Thus, the present invention also relates to an organic glass obtained from the polymerization of a composition as defined above.

More specifically, the invention also relates to an organic glass obtained from the radical polymerization of a composition as defined above.

The organic glass is preferably chosen from instrument or optical detector windows or ophthalmic lenses.

The organic glass is preferably chosen from ophthalmic lenses.

For the purposes of the present invention, the term ophthalmic means a glass able to be mounted in glasses and the function of which is to protect the eyes, in particular from the sun, especially ultraviolet radiation (antisun glass) or to correct the vision. In the latter case, the ophthalmic lens is preferably afocal, unifocal, bifocal, trifocal or progressive.

Thus, the ophthalmic lens may be of multifocal or progressive or degressive multifocal type, that is to say multifocal lenses with variable strength.

The ophthalmic lens obtained may be covered with a coating or treated at the surface thereof.

Advantageously, the invention relates to an ophthalmic lens obtained from the polymerization of a composition as defined above.

According to one embodiment, the ophthalmic lens is obtained from the polymerization of a composition comprising 1-methoxy-1-tert-amylperoxycyclohexane and at least one allylic monomer chosen from diol bis(allyl carbonate) monomers of formula (II) as described above.

Preferably, the ophthalmic lens is obtained from the polymerization of a composition comprising 1-methoxy-1-tert-amylperoxycyclohexane and diethyleneglycol bis(allyl carbonate).

According to one embodiment, the organic glass is chosen from ophthalmic lenses tinted with one or more organic dyes and/or pigments.

In accordance with this embodiment, the ophthalmic lens is preferably obtained from the polymerization of a composition comprising 1-methoxy-1-tert-amylperoxycyclohexane and at least one allylic monomer chosen from diol bis(allyl carbonate) monomers of formula (II) as described above, and one or more pigments and/or organic dyes.

More particularly, the ophthalmic lens is preferably obtained from the polymerization of a composition comprising 1-methoxy-1-tert-amylperoxycyclohexane, diethyleneglycol bis(allyl carbonate) and one or more organic dyes and/or pigments.

Product Resulting from the Polymerizable Composition

Another subject of the present invention relates to the product resulting from the polymerization of one or more allylic monomers and/or one or more allylic copolymers in the presence of one or more peroxides of formula (I).

Thus, the product is a polymer composition (or a polymer product) which results from the polymerization of one or more allylic monomers and/or one or more allylic copolymers in the presence of one or more peroxides of formula (I).

The polymer composition therefore results from the polymerization of the polymerizable composition as defined above, and more specifically of the different constituents of the polymerizable composition.

In other words, the polymer composition corresponds to a resin which may serve as base substance to manufacture any type of object used for its good mechanical and optical properties, especially for its optical qualities.

Preferably, the polymer product or the polymer composition may be shaped so as to obtain an organic glass or any other object used for its mechanical and optical properties, especially for its transparency and its weak coloration or even its colourless character.

The polymer composition is especially in solid form at ambient temperature, that is to say solid at a temperature of between 10° C. and 30° C., more preferentially still between 15° C. and 25° C.

Process for Preparing the Polymer Composition

Similarly, the invention also relates to a process for preparing the polymer composition as defined above, comprising at least one step of polymerization of a polymerizable composition as defined above at one or more temperatures ranging from 40 to 140° C., preferably ranging from 50 to 130° C., even more preferably ranging from 60 to 130° C.

Process for Preparing the Organic Glass

The process for preparing an organic glass comprises at least one step of polymerization of a composition as defined above at one or more temperatures ranging from 40 to 140° C., preferably ranging from 50 to 130° C., even more preferably ranging from 60 to 130° C., in a device comprising at least one mould.

According to one embodiment, the process for preparing the organic glass comprises at least the following steps:

a step of introducing a polymerizable composition as defined above into a device comprising at least one mould, a step of polymerization of said composition at one or more temperatures ranging from 40 to 140° C., preferably ranging from 50 to 130° C., even more preferably ranging from 60 to 130° C.; preferably, the polymerization step is a succession of steps at different temperatures, making it possible to control the shrinkage and polymerization, a step of recovering the organic glass.

In accordance with this embodiment, the introduction step is a step of pouring or injecting the polymerizable composition according to the invention into a device comprising at least one mould.

The device may comprise at least one mould having a complex geometry, for example a biplanar mould, a mould comprising a concave portion and a convex portion, or else a mould of concave shape.

The device preferably comprises at least one mould comprising at least one concave portion and at least one convex portion.

More generally, the device comprises at least one mould, the geometric shape of which has the desired final geometry of the organic glass.

The device may also comprise at least one mould having one face which has a geometry corresponding to the desired final geometry of the organic glass and another face which is not regulated as a function of the final geometry of the organic glass but which makes it possible to prepare a second face of the organic glass, which may subsequently be treated.

Preferably, the introduction step consists in pouring the polymerizable composition between two moulds having the required surface geometries, for example one mould having a concave shape and one mould having a convex shape.

In accordance with the embodiment, the composition preferably comprises at least one peroxide of formula (I), at least one allylic monomer chosen from the diol bis(allylic) monomers of formula (II), and at least one pigment and/or at least one organic dye.

According to this embodiment, the composition may comprise at least one dispersant.

The polymerization step is especially a radical polymerization.

The polymerization step may be carried out by performing heat treatments in a range of temperatures ranging from 40 to 140° C., preferably ranging from 50 to 130° C., even more preferably ranging from 60 to 130° C., for a sufficient duration to lead to polymerization, especially durations which may range from 10 hours to 30 hours.

Thus, the temperature may be gradually increased during the polymerization step.

The polymerization step makes it possible to lead to the desired organic glass.

The process for preparing the organic glass may comprise, after the polymerization step, a step of annealing the organic glass, intended to eliminate any residual stresses in the glass. The annealing step may occur at temperatures which may range from 60 to 130° C., preferably 70 to 100° C., for a duration which may range from 1 hour to 20 hours.

The step of recovering the organic glass may be a step consisting in opening the mould and collecting the organic glass.

Thus, the process for preparing the organic glass preferably comprises a step of pouring or injecting the composition according to the invention into a device comprising at least one mould having a complex geometry, for example a biplanar mould, a mould comprising one concave portion and one convex portion or else a mould of concave shape, preferably a mould having at least one concave portion and at least one convex portion, a step consisting in closing the mould, a step of polymerization of the composition as defined above, and a step consisting in opening the mould and collecting the organic glass.

The process according to the invention especially makes it possible to prepare an ophthalmic lens as described above.

The organic glass obtained following this preparation process may undergo any type of treatment, such as surface treatments, to improve the mechanical and optical properties thereof, or else the wettability properties thereof.

According to one embodiment, as indicated above, the polymerizable composition according to the invention may also comprise at least one colorant, preferably at least one pigment and/or at least one organic dye.

Alternatively, the process for preparing the organic glass according to the invention may comprise an additional step consisting in adding at least one colorant, preferably at least one pigment, after obtaining the organic glass, that is to say after the polymerization step.

The organic glass obtained following this process has good mechanical and optical properties.

The optical quality of the organic glasses according to the invention may be assessed by determining, especially, at least one of the following parameters:
the refractive index ($n^D_{20}$) measured with an Abbe refractometer (standardized method according to ASTM D-542),
the yellowness index (YI) which may be obtained spectroscopically (standardized method according to ASTM D-1925-63) by means of a Macbeth 1500 Plus spectrophotometer according to the following equation:

$$YI=100/Y(1.277X-1.06Z)$$

in which equation X, Y and Z are the trichromatic coordinates of the sample, measured by the spectrophotometer over the whole spectrum between 380 and 780 nanometres, or with a type SP60 spectro-colorimeter from the manufacturer X-RITE, according to standard CIE 1976.

The yellowness index YI is preferably obtained with a type SP60 spectro-colorimeter from the manufacturer X-RITE, according to standard CIE 1976.

Preferably, the yellowness index YI of the organic glass according to the invention, according to standard CIE 1976, is between −10 et+10, and even more preferably between −5 and +5 and even more preferably still between −1 and +2.

The haze value, which may be determined according to standard ASTM D 1003.

Preferably, the haze value of the organic glass according to the invention is less than 5, and even more preferably less than 1, and even more preferably still less than 0.5.

The mechanical properties of the organic glasses according to the invention may be assessed by determining, especially, at least one of the following parameters:
the Rockwell hardness, measured by means of a Rockwell hardness tester (standardized method according to ASTM D-785),
The Shore D hardness (standardized method according to ASTM D 2240; BS 903 Part A26).

Preferably, the Shore D hardness of the organic glass according to the invention is greater than 65.0.
the modulus of elasticity, or
the coefficient of friction.

The examples that follow serve to illustrate the invention without, however, being limiting in nature.

EXAMPLES

A. Example of Synthesis of 1-methoxy-1-t-amylperoxycyclohexane (TAPMC)

A mixture of t-amyl hydroperoxide (TAHP), cyclohexanone and methanol is prepared and treated by means of 70% sulfuric acid at a temperature of between −6° C. and −4° C.

In fifteen minutes, an equilibrium mixture of 1-methoxy-1-t-amylperoxycyclohexane, 1,1-di-(t-amylperoxy)-cyclohexane and unreacted starting products, cyclohexanone and TAHP, is formed.

A small amount (approximately 2%) of cyclohexanone dimethyl ketal (CDMK) is also obtained in the reaction mixture.

The reaction mixture is treated with cold water, then the aqueous phase is separated from the organic phase, which is purified by rinsing.

This method for producing the main initiator of the method according to the invention is given here by way of example, it being understood that those skilled in the art may optionally be able to obtain it by other means well known to those skilled in the art. Moreover, it should be noted that organic peroxides belonging to the same family (close, or even very close, to TAPMC) have been produced and demonstrate the same technical effects obtained within the context of the present invention, namely for the polymerization of allylic monomers and/or allylic copolymers.

B. Example of Preparation of a Polymerizable Composition

A polymerizable composition based on diethylene glycol bis(allyl carbonate) (CAS 142-22-3), sold under the name CR-39® by PPG and on 1-methoxy-1-t-amylperoxycyclohexane (TAPMC) is prepared. The composition preferably comprises a mould-release agent, such as Zelec® UN, available from Stepan.

The 1-methoxy-1-t-amylperoxycyclohexane is present at an amount of 4% by weight relative to the weight of diethylene glycol bis(allyl carbonate).

C. Example of Preparation of an Organic Glass

The previously obtained composition is subsequently poured into a mould having a concave portion and a convex portion. Once poured, the convex portion is closed over the concave portion of the mould, then the assembly is heated to a temperature of 90° C. Several steps with temperature gradients or stages ranging from 60 to 130° C. are carried out over a duration of 10 to 30 h.

The polymerized product obtained in this way is annealed for a duration which may range from 1 to 20 hours at temperatures which may range up to 130° C.

The organic glass is subsequently recovered.

The organic glass has good optical and mechanical properties in accordance with at least one of the parameters described above.

D. Biplanar System for Measuring the Optical Properties

Different optical properties, namely a yellowness index (YI), a haze measurement, and a Shore D hardness, were measured for different organic glasses. These organic glasses were prepared according to the protocol described above, with the exception of the polymerization which was carried out between two 10*15 cm flat sheets of glass, 4 mm thick, arranged vertically, separated by a silicone rubber seal 4 mm in diameter, with the mechanical cohesion of the assembly being produced by a clamping clip at constant pressure. All the tests were carried out with an air intake at the top of the mould.

The yellowness index YI is obtained with a type SP60 spectro-colorimeter from the manufacturer X-RITE, according to standard CIE 1976 (colour space). The trichromatic coordinates are those of Lab Hunter. The measurement is calibrated every day with a standard calibration tile (black and white), serial number: 20609 D65:10°, of 18 Feb. 2010, WO A89274.

The YI measurement is carried out in the thickness of the 4 mm glass, and is expressed as difference to the YI measured on the white zone of the Leneta Form 2A chart (the measurement of the yellowness index of which is 10.48, after calibration of the spectrophotometer).

The haze value is determined by means of a haze measurement device: the Haze-Gard plus apparatus, manufactured by BYK-GARDNER, according to standard ASTM D 1003 (Standard calibration (zero) no. 4733—lightness calibration no. 4732).

The Shore D hardness is measured by means of a portable durometer of HPE II Shore D type (manufacturer: BAREISS, apparatus standardized according to NF T51-174; DIN EN ISO 868; ISO 7619; ASTM D 2240; BS 903 Part A26).

The following organic peroxides were tested:
- diisopropyl peroxydicarbonate (CAS 105-64-6) at 27% by weight in CR-39®, sold by Arkema under the name Luperox® IPP27 (comparative example 1);
- 1-methoxy-1-tert-amylperoxycyclohexane (TAPMC) as sold under the trade name Luperox®V10 by Arkema (example 2 according to the invention);
- a mixture of 70% by weight of 1-methoxy-1-tert-amylperoxycyclohexane (TAPMC) and of 30% by weight of 1,1-di(tert-butylperoxy)-3,3,5-trimethylcyclohexane as sold under the trade name Luperox®V10 and Luperox®231 by Arkema (example 3 according to the invention);
- a mixture of 70% by weight of 1-methoxy-1-tert-amylperoxycyclohexane (TAPMC) and of 30% by weight of 1,1-di(tert-amylperoxy)-cyclohexane as sold under the trade name Luperox®V10 and Luperox®531M60 by Arkema (example 4 according to the invention);
- OO-tert-amyl-O-(2-Ethylhexyl)-monoperoxycarbonate sold by Arkema under the name Luperox® TAEC (comparative example 5);
- OO-tert-butyl-O-(2-Ethylhexyl)-monoperoxycarbonate sold by Arkema under the name Luperox® TBEC (comparative example 6).

The thermal crosslinking cycle is adapted as a function of the decomposition temperature of the organic peroxides used (half life temperatures (HLT) at 1 h and 10 h) according to the following scheme: rise in 14 h up to the 10 h half life temperature (HLT 10 h) of the peroxide used (in the case of a mixture of peroxides, up to the HLT 10 h of the peroxide having the highest HLT 10 h, i.e for example 3, that of Luperox® 231, and for example 4, that of Luperox® 531M60), then rise in 4 h to the 1 h half life temperature (HLT 1 h) of the peroxide used (in the case of a mixture of peroxides, up to the HLT 1 h of the peroxide having the highest HLT 1 h, i.e for example 3, that of Luperox® 231, and for example 4, that of Luperox® 531M60), then cooling down to a temperature of 70° C., at which temperature demoulding is carried out.

The results are presented in the table below:

| References (% by weight) | HLT 1 h in ° C. | HLT 10 h in ° C. | Active Oxygen | % by weight of pure peroxide | YI | Haze | Shore D hardness | Quality of the sheets |
|---|---|---|---|---|---|---|---|---|
| Ex 1 Luperox® IPP27 | 75 | 46 | 0.230 | 2.97 | 0.45 | 0.50 | 74 | + |
| Ex 2 TAMPC | 108 | 87 | 0.12 | 1.67 | 1.08 | 0.39 | 67.4 | + |
|  |  |  | 0.230 | 3.33 | 1.07 | 0.32 | 74.8 | + |
| Ex 3 70% TAPMC-30% Luperox® 231 | (Lup. 231) 115 | (Lup. 231) 96 | 0.131 | 1.67 | 1.03 | 0.46 | 73.1 | + |
|  |  |  | 0.262 | 3.33 | 1.38 | 0.57 | 78.4 | + |
| Ex 4 70% TAPMC-30% Luperox® 531M60 | (Lup. 531M60) 112 | (Lup. 531M60) 93 | 0.114 | 1.67 | 1.09 | 0.56 | 71.3 | + |
|  |  |  | 0.227 | 2.97 | 1.54 | 0.44 | 74.9 | + |
| Ex 5 Luperox® TAEC | 117 | 98 | 0.149 | 2.57 | 3.27 | 1.06 | 80.3 | * |
|  |  |  | 0.223 | 3.85 | 8.00 | 1.32 | 80.2 | * |

| References (% by weight) | HLT 1 h in ° C. | HLT 10 h in ° C. | Active Oxygen | % by weight of pure peroxide | YI | Haze | Shore D hardness | Quality of the sheets |
|---|---|---|---|---|---|---|---|---|
| Ex 6 Luperox® TBEC | 121 | 100 | 0.15 0.215 | 2.27 3.48 | 8.32 11.13 | 1.39 1.42 | 76.2 79.8 | ** ** |

+ Sheets not exhibiting any breakage upon demoulding. The silicone seal was always able to be removed from the sheets without any tearing zones arising.
* Sheets sometimes broken upon demoulding, slight adhesion to the seal without tearing the seal during the removal thereof by manual pulling.
** Sheets always very brittle upon demoulding, adhering to the silicone seal, with tearing of the material during the manual removal of the seal following demoulding.

The active oxygen % is expressed in the following manner: $A[O]=n*16*titre(\%)/Mw$, where n=number of peroxide functions present in the peroxide molecule, 16 is the molecular weight in g/mol of an atom of oxygen, and Mw is the molecular weight in g/mol of the peroxide.

It is noted that the use of TAPMC at a significantly higher temperature compared to the reference produced with IPP27 virtually does not adversely affect the yellowness index.

It is also noted that at an equivalent active oxygen content to example 1 (around 0.23%), the compositions of examples 3 and 4 do not substantially modify the YI value, despite a temperature in this case which is also higher than for example 1, and enables greater hardness, without thereby leading to sheets which are brittle upon demoulding.

It is also noted that at a lower dose, corresponding to an A[O] of around 0.12-0.13%, the addition of a bifunctional cyclic peroxide according to the invention (example 3) or of a tert-amyl perketal (example 4) makes it possible to come close to a hardness close to that of example 1.

It is possible to conclude from examples 5 and 6 that the mono tert-amyl percarbonate, Luperox® TAEC, and the mono tert-butyl percarbonate Luperox® TBEC lead to sheets which have a much higher yellowness index (YI) compared to the reference from example 1 and to examples 2 to 4. Moreover, for example 6, despite a hardness comparable to that of example 5, the sheets break upon demoulding after crosslinking and the sheet cannot be readily detached from the seal, which partially tears.

Examples 5 and 6 therefore show that the use of peroxides of percarbonate type does not make it possible to form sheets with a good yellowness index (YI), low haze and high hardness, without this being accompanied by breakage upon demoulding

The invention claimed is:

1. A process for polymerizing one or more allylic monomers and/or allylic copolymers comprising using one or more peroxides of the following formula (I):

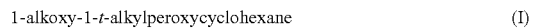

1-alkoxy-1-$t$-alkylperoxycyclohexane  (I)

wherein in formula (I) the alkoxy group comprises from 1 to 4 carbon atoms, the t-alkyl group comprises from 4 to 12 carbon atoms, and the cyclohexane ring is optionally substituted by 1 or 3 alkyl groups, each comprising from 1 to 3 carbon atoms.

2. The process according to claim 1, wherein the peroxide(s) of formula (I) is/are selected from the group consisting of 1-methoxy-1-tert-amylperoxycyclohexane (TAPMC), 1-methoxy-1-t-butylperoxycyclohexane (TBPMC), 1-methoxy-1-t-amylperoxy-3,3,5-trimethylcyclohexane, 1-methoxy-1-t-butylperoxy-3,3,5-trimethylcyclohexane, 1-ethoxy-1-t-amylperoxycyclohexane (TAPEC), 1-ethoxy-1-t-butylperoxycyclohexane (TBPEC), 1-ethoxy-1-t-amylperoxy-3,3,5-trimethylcyclohexane and/or 1-ethoxy-1-t-butylperoxy-3,3,5-trimethylcyclohexane.

3. The process according to claim 1, wherein the peroxide of formula (I) is 1-methoxy-1-tert-amylperoxycyclohexane.

4. The process according to claim 1, wherein the allylic monomer(s) is/are chosen from bis(allyl carbonate) monomers.

5. The process according to claim 1, wherein the allylic monomer(s) is/are chosen from diol bis(allyl carbonate) monomers of the following formula (II):

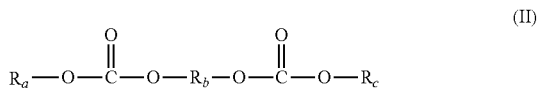

wherein in formula (II):
$R_a$ and $R_c$, which are identical or different, represent an allyl group of the following formula:

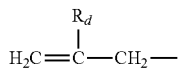

wherein $R_d$ is selected from the group consisting of:
a hydrogen atom,
a halogen atom, and
a linear or branched $C_1$-$C_4$ alkyl group, and
$R_b$ is selected from the group consisting of alkylene groups, alkylene ether groups, aromatic alkylene ether groups, alkylene polyether groups, alkylene carbonate groups and mixtures thereof.

6. The process according to claim 1, wherein the allylic monomer(s) is/are selected from the group consisting of ethylene glycol bis(allyl carbonate), diethylene glycol bis(2-methyl carbonate), diethylene glycol bis(allyl carbonate), ethylene glycol bis(2-chloro allyl carbonate), triethylene glycol bis(allyl carbonate), 1,3-propanediol bis(allyl carbonate), propylene glycol bis(2-ethyl allyl carbonate), 1,3-butenediol bis(allyl carbonate), 1,4-butenediol bis(2-bromo allyl carbonate), dipropylene glycol bis(allyl carbonate), trimethylene glycol bis(2-ethyl allyl carbonate), pentamethylene glycol bis(allyl carbonate), isopropylene bis phenol-A bis(allyl carbonate) and mixtures thereof.

7. The process according to claim 1, wherein the allylic monomer is diethylene glycol bis(allyl carbonate).

8. The process according to claim 1, wherein the allylic copolymer(s) is/are obtained from the polymerization of diol bis(allyl carbonate) monomers of the following formula (II):

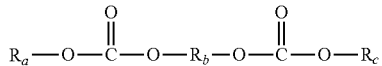

wherein in formula (II):
$R_a$ and $R_c$, which are identical or different, represent an allyl group of the following formula:

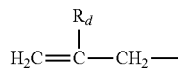

wherein $R_d$ is selected from the group consisting of:
- a hydrogen atom,
- a halogen atom, and
- a linear or branched $C_1$-$C_4$ alkyl group, and
- $R_b$ is selected from the group consisting of alkylene groups, alkylene ether groups, aromatic alkylene ether groups, alkylene polyether groups, alkylene carbonate groups and mixtures thereof.

9. The process according to claim 1, wherein the allylic copolymer(s) is/are chosen from polyol poly(allyl carbonates).

10. The process according to claim 1, wherein the allylic copolymer(s) is/are obtained from the polymerization of a bis(allyl carbonate) monomer and a polyether diol.

11. A polymerizable composition comprising at least one peroxide of formula (I):

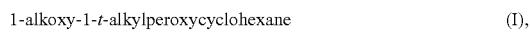

1-alkoxy-1-*t*-alkylperoxycyclohexane    (I), wherein in formula (I), the alkoxy group comprises from 1 to 4 carbon atoms, the t-alkyl group comprises from 4 to 12 carbon atoms, and the cyclohexane ring is optionally substituted by 1 or 3 alkyl groups, each comprising from 1 to 3 carbon atoms, and at least one allylic monomer, wherein the allylic monomer(s) is/are selected from the group consisting of ethylene glycol bis(allyl carbonate), diethylene glycol bis(2-methyl carbonate), diethylene glycol bis(allyl carbonate), ethylene glycol bis(2-chloro allyl carbonate), triethylene glycol bis(allyl carbonate), 1,3-propanediol bis(allyl carbonate), propylene glycol bis(2-ethyl allyl carbonate), 1,3-butenediol bis(allyl carbonate), 1,4-butenediol bis(2-bromo allyl carbonate), dipropylene glycol bis(allyl carbonate), trimethylene glycol bis(2-ethyl allyl carbonate), pentamethylene glycol bis(allyl carbonate), isopropylene bis phenol-A bis(allyl carbonate) and mixtures thereof, and/or at least one allylic copolymer, wherein the allylic copolymer(s) is/are obtained from the polymerization of diol bis(allyl carbonate) monomers, wherein the diol bis(allyl carbonate) monomers are selected from the group consisting of ethylene glycol bis(allyl carbonate), diethylene glycol bis(2-methyl carbonate), diethylene glycol bis(allyl carbonate), ethylene glycol bis(2-chloro allyl carbonate), triethylene glycol bis(allyl carbonate), 1,3-propanediol bis(allyl carbonate), propylene glycol bis(2-ethyl allyl carbonate), 1,3-butenediol bis(allyl carbonate), 1,4-butenediol bis(2-bromo allyl carbonate), dipropylene glycol bis(allyl carbonate), trimethylene glycol bis(2-ethyl allyl carbonate), pentamethylene glycol bis(allyl carbonate), isopropylene bis phenol-A bis(allyl carbonate) and mixtures.

12. The composition according to claim 11, further comprising at least one additional peroxide other than the peroxides of formula (I).

13. The composition according to claim 12, wherein the ratio between the peroxide(s) of formula (I) and the at least one additional peroxide other than the peroxides of formula (I) is between 99:1 and 30:70.

14. The composition according to claim 11, further comprising at least one photoinitiator.

15. A process for preparing a polymer composition comprising at least one step of polymerization of a polymerizable composition as defined according to claim 11 one or more temperatures ranging from 40 to 140° C.

16. A process for preparing an organic glass comprising at least the following successive steps:
- a step of introducing a polymerizable composition as defined according to claim 11 into a device comprising at least one mould,
- a step of polymerization of said composition at one or more temperatures ranging from 40 to 140° C., and
- a step of recovering the organic glass.

17. The composition according to claim 11, further comprising at least one additional peroxide other than the peroxides of formula (I), wherein the at least one additional peroxide is chosen from the peroxides of formula (III):

bis-*t*-alkylperoxycyclohexane    (III), wherein in formula (III), each t-alkyl group comprises from 4 to 12 carbon atoms and the cyclohexane ring is optionally substituted by 1 or 3 alkyl groups, each comprising from 1 to 3 carbon atoms.

* * * * *